United States Patent
Pani et al.

(10) Patent No.: US 12,133,132 B2
(45) Date of Patent: *Oct. 29, 2024

(54) METHOD AND APPARATUS SUPPORTING RANDOM ACCESS TRANSMISSIONS

(71) Applicant: Pantech Wireless, LLC, Cedar Park, TX (US)

(72) Inventors: Diana Pani, Montreal (CA); Rocco DiGirolamo, Laval (CA); Christopher R. Cave, Dollard-des-Ormeaux (CA); Paul Marinier, Brossard (CA); Benoit Pelletier, Roxboro (CA)

(73) Assignee: Pantech Wireless, LLC, Cedar Park, TX (US)

( * ) Notice: Subject to any disclaimer, the term of this patent is extended or adjusted under 35 U.S.C. 154(b) by 183 days.

This patent is subject to a terminal disclaimer.

(21) Appl. No.: 17/099,407

(22) Filed: Nov. 16, 2020

(65) Prior Publication Data

US 2021/0076288 A1 Mar. 11, 2021

Related U.S. Application Data

(63) Continuation of application No. 16/440,886, filed on Jun. 13, 2019, which is a continuation of application
(Continued)

(51) Int. Cl.
*H04W 36/30* (2009.01)
*H04W 8/26* (2009.01)
(Continued)

(52) U.S. Cl.
CPC ............. *H04W 36/30* (2013.01); *H04W 8/26* (2013.01); *H04W 24/10* (2013.01);
(Continued)

(58) Field of Classification Search
CPC ....... H04W 36/30; H04W 8/26; H04W 24/10; H04W 36/0072; H04W 36/0088; H04W 36/04; H04W 36/08; H04W 36/165
See application file for complete search history.

(56) References Cited

U.S. PATENT DOCUMENTS

| 6,167,248 A | 12/2000 | Hamalainen et al. |
| 6,246,692 B1 | 6/2001 | Dai et al. |

(Continued)

FOREIGN PATENT DOCUMENTS

| CA | 2 615 915 | 3/2004 |
| CN | 1777080 | 5/2006 |

(Continued)

OTHER PUBLICATIONS

Ericsson, "Contention resolution for enhanced uplink in CELL_FACH," 3GPP TSG RAN WG2 #60bis, R2-080043, Sevilla Spain (Jan. 14-18, 2008).

(Continued)

*Primary Examiner* — John D Blanton
(74) *Attorney, Agent, or Firm* — Volpe Koenig

(57) ABSTRACT

A method and a wireless transmit/receive unit (WTRU) are disclosed. The WTRU comprises a transceiver and a processor. The WTRU receives a system information block (SIB) from a base station, wherein the SIB indicates random access transmission uplink resources. After receiving the SIB, the WTRU transmits a random access preamble to the base station. After transmitting the random access preamble, the WTRU transmits, using one or more of the uplink resources indicated by the SIB, a first message to the base station, wherein the first message includes a first radio network temporary identifier (RNTI) of the WTRU. After transmitting the first message, the WTRU receives a second message from the base station, wherein the second message is derived from a second RNTI, the second RNTI being (Continued)

different than the first RNTI. After receiving the second message, the WTRU transmits to the base station.

16 Claims, 3 Drawing Sheets

Related U.S. Application Data

No. 15/782,532, filed on Oct. 12, 2017, now Pat. No. 10,327,188, which is a continuation of application No. 15/135,616, filed on Apr. 22, 2016, now abandoned, which is a continuation of application No. 14/875,059, filed on Oct. 5, 2015, now abandoned, which is a continuation of application No. 13/665,734, filed on Oct. 31, 2012, now Pat. No. 9,161,285, which is a continuation of application No. 12/346,631, filed on Dec. 30, 2008, now Pat. No. 8,325,684.

(60) Provisional application No. 61/018,567, filed on Jan. 2, 2008.

(51) Int. Cl.
| | | |
|---|---|---|
| *H04W 24/10* | (2009.01) | |
| *H04W 36/00* | (2009.01) | |
| *H04W 36/04* | (2009.01) | |
| *H04W 36/08* | (2009.01) | |
| *H04W 36/16* | (2009.01) | |
| *H04W 36/36* | (2009.01) | |
| *H04W 74/0833* | (2024.01) | |
| *H04W 88/08* | (2009.01) | |

(52) U.S. Cl.
CPC ... *H04W 36/0072* (2013.01); *H04W 36/0088* (2013.01); *H04W 36/04* (2013.01); *H04W 36/08* (2013.01); *H04W 36/165* (2013.01); *H04W 36/36* (2013.01); *H04W 74/0833* (2013.01); *H04W 88/08* (2013.01)

(56) References Cited

U.S. PATENT DOCUMENTS

| | | |
|---|---|---|
| 6,363,121 B1 | 3/2002 | Hochwald et al. |
| 6,721,566 B2 | 4/2004 | Longoni et al. |
| 6,845,238 B1 | 1/2005 | Muller |
| 7,079,489 B2 | 7/2006 | Massie et al. |
| 7,145,889 B1 | 12/2006 | Zhang et al. |
| 7,406,314 B2 | 7/2008 | Sharma |
| 7,477,609 B2 | 1/2009 | Agin |
| 7,480,269 B2 | 1/2009 | Heo et al. |
| 7,508,792 B2 | 3/2009 | Petrovic et al. |
| 7,643,419 B2 | 1/2010 | Terry et al. |
| 7,643,515 B2 | 1/2010 | Willenegger |
| 7,890,094 B2 | 2/2011 | Iwamura |
| 7,894,390 B2 | 2/2011 | Nakamata et al. |
| 8,072,932 B2 | 12/2011 | Sun et al. |
| 8,112,090 B2 | 2/2012 | Tanno et al. |
| 8,175,604 B2 | 5/2012 | Lohr et al. |
| 8,218,488 B2 | 7/2012 | Wager |
| 8,259,752 B2 | 9/2012 | Terry et al. |
| 8,300,697 B2 | 10/2012 | Farfade et al. |
| 8,774,104 B2 | 7/2014 | Pelletier et al. |
| 8,989,082 B2 | 3/2015 | Wigard et al. |
| 9,313,809 B2 | 4/2016 | Pelletier et al. |
| 9,844,093 B2 | 12/2017 | Pani et al. |
| 9,979,514 B2 | 5/2018 | Tseng |
| 10,880,791 B2 | 12/2020 | Wang et al. |
| 2002/0097740 A1 | 7/2002 | Choi et al. |
| 2002/0145985 A1 | 10/2002 | Love et al. |
| 2003/0223452 A1 | 12/2003 | Toskala et al. |
| 2004/0052229 A1 | 3/2004 | Terry et al. |
| 2004/0068505 A1 | 4/2004 | Lee et al. |
| 2004/0117860 A1 | 6/2004 | Yi et al. |
| 2005/0026623 A1 | 2/2005 | Fisher |
| 2005/0053035 A1 | 3/2005 | Kwak et al. |
| 2005/0054298 A1 | 3/2005 | Chen |
| 2005/0059407 A1 | 3/2005 | Reed et al. |
| 2005/0094586 A1 | 5/2005 | Zhang et al. |
| 2005/0101299 A1 | 5/2005 | Farnsworth |
| 2005/0180371 A1 | 8/2005 | Malkamaki et al. |
| 2005/0249163 A1 | 11/2005 | Kim et al. |
| 2005/0250504 A1 | 11/2005 | Mikola |
| 2005/0251722 A1 | 11/2005 | Terry et al. |
| 2005/0265301 A1 | 12/2005 | Heo et al. |
| 2005/0276266 A1 | 12/2005 | Terry |
| 2005/0281219 A1 | 12/2005 | Kim et al. |
| 2006/0023629 A1 | 2/2006 | Kim et al. |
| 2006/0026490 A1 | 2/2006 | Rinne et al. |
| 2006/0039326 A1 | 2/2006 | Jeong et al. |
| 2006/0088058 A1 | 4/2006 | Eckert et al. |
| 2006/0092876 A1 | 5/2006 | Kwak et al. |
| 2006/0116118 A1 | 6/2006 | Charriere et al. |
| 2006/0140154 A1 | 6/2006 | Kwak et al. |
| 2006/0142032 A1 | 6/2006 | Derakhshan et al. |
| 2006/0164993 A1 | 7/2006 | Teague et al. |
| 2006/0165045 A1 | 7/2006 | Kim et al. |
| 2006/0172739 A1 | 8/2006 | Wigard et al. |
| 2006/0176845 A1 | 8/2006 | Sarkkinen |
| 2006/0182065 A1 | 8/2006 | Petrovic et al. |
| 2006/0223532 A1* | 10/2006 | Liu .................. H04W 8/02 |
| | | 455/436 |
| 2006/0251027 A1 | 11/2006 | Chun et al. |
| 2006/0252377 A1 | 11/2006 | Jeong et al. |
| 2006/0280145 A1 | 12/2006 | Revel et al. |
| 2007/0041347 A1 | 2/2007 | Beale et al. |
| 2007/0047445 A1 | 3/2007 | Usuda et al. |
| 2007/0047451 A1 | 3/2007 | Lohr et al. |
| 2007/0047452 A1 | 3/2007 | Lohr et al. |
| 2007/0047493 A1 | 3/2007 | Park et al. |
| 2007/0049209 A1 | 3/2007 | Usuda et al. |
| 2007/0060142 A1 | 3/2007 | Reznik et al. |
| 2007/0061673 A1 | 3/2007 | Pan et al. |
| 2007/0097937 A1 | 5/2007 | Kubota et al. |
| 2007/0115871 A1 | 5/2007 | Zhang et al. |
| 2007/0135113 A1 | 6/2007 | Moinet et al. |
| 2007/0135130 A1 | 6/2007 | Lee |
| 2007/0177628 A1 | 8/2007 | Choi et al. |
| 2007/0189237 A1 | 8/2007 | Jaatinen et al. |
| 2007/0206531 A1 | 9/2007 | Pajukoski et al. |
| 2007/0213059 A1 | 9/2007 | Shaheen |
| 2007/0223609 A1 | 9/2007 | Obuchi et al. |
| 2007/0230398 A1 | 10/2007 | Jiang |
| 2007/0258402 A1 | 11/2007 | Nakamata et al. |
| 2008/0008152 A1 | 1/2008 | Lohr et al. |
| 2008/0049669 A1 | 2/2008 | Lundby et al. |
| 2008/0081651 A1 | 4/2008 | Kuroda et al. |
| 2008/0095185 A1* | 4/2008 | DiGirolamo ........ H04L 1/0026 |
| | | 370/464 |
| 2008/0117891 A1 | 5/2008 | Damnjanovic et al. |
| 2008/0125043 A1 | 5/2008 | Karmanenko et al. |
| 2008/0130492 A1 | 6/2008 | Kuo |
| 2008/0130533 A1 | 6/2008 | Dottling et al. |
| 2008/0182594 A1 | 7/2008 | Flore et al. |
| 2008/0192766 A1 | 8/2008 | Ranta-Aho et al. |
| 2008/0194259 A1 | 8/2008 | Vujcic et al. |
| 2008/0205433 A1 | 8/2008 | Pihlaja et al. |
| 2008/0214225 A1 | 9/2008 | Choukroun |
| 2008/0254804 A1 | 10/2008 | Lohr et al. |
| 2008/0268852 A1 | 10/2008 | Petrovic et al. |
| 2008/0273610 A1* | 11/2008 | Malladi .............. H04L 1/0032 |
| | | 375/260 |
| 2009/0006778 A1 | 1/2009 | Sidi et al. |
| 2009/0010278 A1 | 1/2009 | Torsner et al. |
| 2009/0011795 A1 | 1/2009 | Fukui et al. |
| 2009/0046573 A1 | 2/2009 | Damnjanovic |
| 2009/0061881 A1 | 3/2009 | Gonsa et al. |
| 2009/0086671 A1 | 4/2009 | Pelletier et al. |
| 2009/0088134 A1 | 4/2009 | Ishii et al. |
| 2009/0131052 A1 | 5/2009 | Hakola et al. |
| 2009/0135769 A1 | 5/2009 | Sambhwani et al. |
| 2009/0143074 A1 | 6/2009 | Pelletier et al. |

(56) References Cited

U.S. PATENT DOCUMENTS

| | | | |
|---|---|---|---|
| 2009/0168704 A1 | 7/2009 | Lee et al. | |
| 2009/0168724 A1 | 7/2009 | Umesh et al. | |
| 2009/0196239 A1 | 8/2009 | Lee et al. | |
| 2009/0219868 A1 | 9/2009 | Lee et al. | |
| 2009/0225709 A1 | 9/2009 | Wager et al. | |
| 2009/0225739 A1 | 9/2009 | Yeo et al. | |
| 2009/0257407 A1 | 10/2009 | Park et al. | |
| 2009/0318170 A1 | 12/2009 | Lee et al. | |
| 2010/0091652 A1 | 4/2010 | Lin | |
| 2010/0103852 A1 | 4/2010 | Jactat | |
| 2010/0178920 A1* | 7/2010 | Kitazoe | H04W 36/0079 455/436 |
| 2010/0189071 A1 | 7/2010 | Kitazoe | |
| 2010/0208688 A1 | 8/2010 | Ma et al. | |
| 2010/0215005 A1 | 8/2010 | Pradas et al. | |
| 2010/0216471 A1 | 8/2010 | Meyer et al. | |
| 2010/0220624 A1 | 9/2010 | Ma et al. | |
| 2010/0278143 A1 | 11/2010 | Chun et al. | |
| 2010/0285791 A1 | 11/2010 | Pirskanen et al. | |
| 2010/0309877 A1* | 12/2010 | Damnjanovic | H04W 74/002 370/329 |
| 2010/0325502 A1 | 12/2010 | Lindskog et al. | |
| 2011/0010598 A1 | 1/2011 | Wang et al. | |
| 2011/0051840 A1 | 3/2011 | Hooki et al. | |
| 2011/0164540 A1 | 7/2011 | Lee et al. | |
| 2012/0327833 A1 | 12/2012 | Kim et al. | |
| 2015/0334619 A1 | 11/2015 | Hakola et al. | |
| 2016/0029415 A1 | 1/2016 | Pelletier et al. | |
| 2018/0070403 A1 | 3/2018 | Uemura et al. | |

FOREIGN PATENT DOCUMENTS

| | | |
|---|---|---|
| CN | 1921683 A | 2/2007 |
| CN | 101064943 A | 10/2007 |
| EP | 2023683 A1 | 2/2009 |
| GB | 2 371 179 | 7/2002 |
| JP | 2007-124493 A | 5/2007 |
| JP | 2007-525036 A | 8/2007 |
| KR | 20040089937 | 10/2004 |
| WO | 04/100598 | 11/2004 |
| WO | 05/006829 | 1/2005 |
| WO | 2005/018241 A2 | 2/2005 |
| WO | 05/020474 | 3/2005 |
| WO | 2005/022813 | 3/2005 |
| WO | 05/089050 | 9/2005 |
| WO | 05/101886 | 10/2005 |
| WO | 06/043782 | 4/2006 |
| WO | 2006/134950 A1 | 12/2006 |
| WO | 07/027032 | 3/2007 |
| WO | 2007/024099 A2 | 3/2007 |
| WO | 07/048470 | 5/2007 |
| WO | 2007/066882 A1 | 6/2007 |
| WO | 07/077250 | 7/2007 |
| WO | 07/078155 | 7/2007 |
| WO | 2007/087842 A1 | 8/2007 |
| WO | 2008/081222 A1 | 7/2008 |
| WO | 08/097489 | 8/2008 |
| WO | 08/137421 | 11/2008 |
| WO | 2009/019198 A1 | 2/2009 |
| WO | 2009/022855 A2 | 2/2009 |
| WO | 2010/124228 | 10/2010 |
| WO | 2013/040026 | 3/2013 |

OTHER PUBLICATIONS

Ericsson, "Enhanced Uplink for CELL_FACH," 3GPP TSG RAN WG1 #50-bis, R1-073954, Shanghai, China (Oct. 8-12, 2007).
Ericsson, "Implicit release for enhanced uplink in CELL_FACH," 3GPP TSG RAN WG2 #61bis, R2-081501 (Mar. 31-Apr. 8, 2008).
Ericsson, "Resource release of common E-DCH in CELL_FACH," 3GPP TSG RAN WG2 #60bis, R2-080044 (Jan. 14-18, 2008).
Huawei, "Release procedure of E-RACH," 3GPP TSG RAN2 #60bis, R2-080262 (Jan. 14-18, 2008).
Huawei, "RLF back off for Enhanced Uplink in CELL_FACH state," 3GPP TSG-RAN WG2 #63, R2-084415, Jeju Island, KR, (Aug. 18-22, 2008).
Infineon Technologies, "Multiplexing option selection in case of E_DCH_Transmission equal False," 3GPP TSG-RAN WG2 Meeting #58, R2-072054, Kobe, Japan, (May 7-11, 2007).
Infineon, "CELL_FACH E-DCH scheduling simplifications," 3GPP TSG-RAN WG2 Meeting #61, R2-080894, Sorrento, Italy, (Feb. 11-15, 2008).
Infineon, "Resource release mechanisms for CELL_FACH E-DCH," 3GPP TSG-RAN WG2 Meeting #60bis, R2-080148 (Jan. 14-18, 2008).
Nokia Corporation et al., "Enhanced Uplink for CELL_FACH in 25.321," 3GPP TSG-RAN WG2 Meeting #61, R2-081774, Shenzhen, China (Mar. 31-Apr. 4, 2008).
Nokia Corporation et al., "Introduction of Enhanced Uplink in CELL_FACH in 25.319," 3GPP TSG RAN WG2 meeting #62, R2-082368, Kansas City, USA (May 5-9, 2008). (See pp. 5-7 and 30-35).
Nokia Corporation et al., "Introduction of Uplink Enhanced CELL_FACH in 25.321 (Draft CR)", Change Request, 25.23, CR CRNum, Current Version: 8.1.0, 3GPP TSG-RAN WG2 Meeting #62, R2-082371, (Kansas City, USA, May 5-9, 2008).
Nokia et al., "CELL_FACH state E-DCH—coverage comparison," 3GPP TSG-RAN WG1 Meeting #50bis, R1-074302 (Oct. 8-12, 2007).
Nokia et al., "Enhanced CELL_FACH State with E-DCH," 3GPP TSG-RAN WG2 Meeting #59bis, R1-074300 (Oct. 8-12, 2007).
Nokia et al., "Resource assignment for E-DCH access in CELL_FACH state," 3GPP TSG-WG1 Meeting #50-BIS, R1-074303 (Oct. 8-12, 2007).
Nokia Siemens Networks, "on E-DCH resource release," 3GPP TSG-RAN WG2 Meeting #62, R2-082579, Kansas City, USA (May 5-9, 2008).
Nokia Siemens Networks, "Draft CR on TS25.435 For Enhanced Uplink In CELL_FACH", Change Request, 25.435, CR, Current Version: 7.8.0, 3GPP TSG-RAN WG3 Meeting #60, R3-081276, (Kansas City, USA, May 5-9, 2008.
Nokia Siemens Networks, "Introduction of Enhanced CELL_FACH state," 3GPP TSG-2 Meeting #57, R2-071556, St. Julian's, Malta (Mar. 26-30, 2007).
NSN et al, "Further Discussion On Enhanced CELL_FACH in REL8", 3GPP TSG-RAN WG-2 Meeting #59, R2-073254, (Athens, Greece, Aug. 20-24, 2007).
NTT Docomo, Inc., "Issues regarding persistent scheduling," 3GPP TSG RAN WG2 #59, R2-073567, Athens, Greece (Aug. 20-24, 2007).
Qualcomm Europe, "L1/2 aspects for enhanced UL for CELL_FACH," 3GPP TSG-RAN WG1 #50-bis, R1-074126 (Oct. 8-12, 2007).
Qualcomm Europe, "E-DCH Resource Release in CELL_FACH," 3GPP TSG-RAN WG3 #60, R3-081091, Kansas City, Missouri, US (May 5-9, 2008).
Qualcomm Europe, "Empty Buffer Status reporting and Implicit release for CCCH messages using enhanced uplink in CELL_FACH," 3GPP TSG-RAN WG2 #61-bis, R2-081581, Shenzhen, China (March 31-Apr. 4, 2008).
Qualcomm Europe, "E-RNTI handling in Active Set Update procedure," 3GPP TSG-RAN WG 2 Meeting #51, R2-060682 (Feb. 13-17, 2006).
Qualcomm Europe, "Layer 1/2 aspects for enhanced UL for CELL_FACH," 3GPP TSG-RAN WG2 #59bis, R2-074390 (Oct. 8-12, 2007).
Third Generation Partnership Project Support Team, "Minutes of The 59bis TSG-WG2 Meeting (Shanghai, China, Oct. 8-12, 2007)", TSG-RAN WG2 meeting #60, R2-075189, (Korea Nov. 5-9, 2007).
Third Generation Partnership Project Work Area, "Enhanced Uplink for CELL_FACH State In FDD", TSG-RAN #37 Meeting, RP-070677, (Riga, Latvia, Sep. 11-14, 2007).
Third Generation Partnership Project, "3rd Generation Partnership Project; Technical Specification Group Radio Access Network; Radio Interface Protocol Architecture (Release 7)," 3GPP TS 25.301 V7.3.0 (Sep. 2007).

(56) References Cited

OTHER PUBLICATIONS

Third Generation Partnership Project, "Technical Specification Group Radio Access Network; Radio Interface Protocol Architecture (Release 8)," 3GPP TS 25.301 V8.3.0 (Sep. 2008).
Third Generation Partnership Project, "Technical Specification Group Radio Access Network; Enhanced Uplink; Overall description; Stage 2 (Release 7)," 3GPP TS 25.319 V2.0.0 (May 2006).
Third Generation Partnership Project, "Technical Specification Group Radio Access Network; Enhanced Uplink; Overall Description; Stage 2 (Release7)", 3GPP TS 25.319, V7.2.0, (Mar. 2007).
Third Generation Partnership Project, "Technical Specification Group Radio Access Network; Enhanced Uplink; Overall Description; Stage 2 (Release7)", 3GPP TS 25.319, V7.6.0, (May 2007).
Third Generation Partnership Project, "Technical Specification Group Radio Access Network; Enhanced Uplink; Overall Description; Stage 2 (Release7)", 3GPP TS 25.319, V8.3.0, (Sep. 2008).
Third Generation Partnership Project, "Technical Specification Group Radio Access Network; Physical channels and mapping of transport channels onto physical channels (FDD) (Release 7)," 3GPP TS 25.211 V7.2.0 (May 2007).
Third Generation Partnership Project, "Technical Specification Group Radio Access Network; Medium Access Control (MAC) protocol specification (Release 6)," 3GPP TS 25.321 V6.14.0 (Sep. 2007).
Third Generation Partnership Project, "Technical Specification Group Radio Access Network; Medium Access Control (MAC) protocol specification (Release 7)," 3GPP TS 25.321 V7.3.0 (Dec. 2006).
Third Generation Partnership Project, Technical Specification Group Radio Access Network; Medium Access Control (MAC) Protocol Specification (Release 7), 3GPP TS 25.321, V7.5.0, (Jun. 2007).
Third Generation Partnership Project, Technical Specification Group Radio Access Network; Medium Access Control (MAC) Protocol Specification (Release 7), 3GPP TS 25.321, V7.10.0, (Jun. 2008).
Third Generation Partnership Project, Technical Specification Group Radio Access Network; Medium Access Control (MAC) Protocol Specification (Release 7), 3GPP TS 25.321, V8.3.0, (Sep. 2008).
Third Generation Partnership Project, "Technical Specification Group Radio Access Network; UTRAN lur Interface User Plane Protocols for Common Transport Channel Data Streams (Release 6)," 3GPP TS 25.425 V6.4.0 (Dec. 2006).
Third Generation Partnership Project, "Technical Specification Group Radio Access Network; UTRAN lur Interface User Plane Protocols for Common Transport Channel Data Streams (Release 6)," 3GPP TS 25.425 V6.5.0 (Sep. 2008).
Third Generation Partnership Project, "Technical Specification Group Radio Access Network; Medium Access Control (MAC) protocol specification (Release 1999)," 3GPP TS 25.321 V3.17.0 (Jun. 2004).
Third Generation Partnership Project, "Technical Specification Group Radio Access Network; Medium Access Control (MAC) protocol specification (Release 4)," 3GPP TS 25.321 V4.10.0 (Jun. 2004).
Third Generation Partnership Project, "Technical Specification Group Radio Access Network; Medium Access Control (MAC) protocol specification (Release 5)," 3GPP TS 25.321 V5.13.0 (Mar. 2007).
Third Generation Partnership Project, "Technical Specification Group Radio Access Network; Medium Access Control (MAC) protocol specification (Release 5)," 3GPP TS 25.321 V5.14.0 (Sep. 2008).
Third Generation Partnership Project, "Technical Specification Group Radio Access Network; Enhanced Uplink; Overall Description; Stage 2 (Release7)", 3GPP TS 25.319, V7.3.0, (Sep. 2007).
Third Generation Partnership Project, Technical Specification Group Radio Access Network; Medium Access Control (MAC) Protocol Specification (Release 7), 3GPP TS 25.321, V7.6.0, Sep. 2007).
Third Generation Partnership Project, "Technical Specification Group Radio Access Network; Physical channels and mapping of transport channels onto physical channels (FDD) (Release 1999)," 3GPP TS 25.211 V3.12.0 (Sep. 2002).
Third Generation Partnership Project, "Technical Specification Group Radio Access Network; Physical channels and mapping of transport channels onto physical channels (FDD) (Release 4)," 3GPP TS 25.211 V4.6.0 (Sep. 2002).

Third Generation Partnership Project, "Technical Specification Group Radio Access Network; Physical channels and mapping of transport channels onto physical channels (FDD) (Release 5)," 3GPP TS 25.211 V5.8.0 (Dec. 2005).
Third Generation Partnership Project, "Technical Specification Group Radio Access Network; Physical channels and mapping of transport channels onto physical channels (FDD) (Release 6)," 3GPP TS 25.211 V6.9.0 (Nov. 2007).
Third Generation Partnership Project, "Technical Specification Group Radio Access Network; Physical channels and mapping of transport channels onto physical channels (FDD) (Release 7)," 3GPP TS 25.211 V7.6.0 (May 2008).
Third Generation Partnership Project, "Technical Specification Group Radio Access Network; Physical channels and mapping of transport channels onto physical channels (FDD) (Release 7)," 3GPP TS 25.211 V7.4.0 (Mar. 2007).
Third Generation Partnership Project, "Technical Specification Group Radio Access Network; Physical channels and mapping of transport channels onto physical channels (FDD) (Release 8)," 3GPP TS 25.211 V8.3.0 (Sep. 2008).
Third Generation Partnership Project, "Technical Specification Group Radio Access Network; UTRAN lur Interface User Plane Protocols for Common Transport Channel Data Streams (Release 7)," 3GPP TS 25.425 V7.4.0 (Jun. 2007).
Third Generation Partnership Project, "Technical Specification Group Radio Access Network; UTRAN lur Interface User Plane Protocols for Common Transport Channel Data Streams (Release 7)," 3GPP TS 25.425 V7.6.0 (Dec. 2007).
Third Generation Partnership Project, "Technical Specification Group Radio Access Network; UTRAN lur Interface User Plane Protocols for Common Transport Channel Data Streams (Release 7)," 3GPP TS 25.425 V7.9.0 (Dec. 2008).
Third Generation Partnership Project, "Technical Specification Group Radio Access Network; UTRAN lur Interface User Plane Protocols for Common Transport Channel Data Streams (Release 8)," 3GPP TS 25.425 V8.1.0 (Dec. 2008).
Third Generation Partnership Project, "Technical Specification Group Radio Access Network; UTRAN lur Interface User Plane Protocols for Common Transport Channel Data Streams (Release 8)," 3GPP TS 25.425 V6.6.0 (Dec. 2008).
Third Generation Partnership Project, "Technical Specification Group Radio Access Network; Physical channels and mapping of transport channels onto physical channels (FDD) (Release 5)," 3GPP TS 25.211 V7.9.0 (Dec. 2009).
Third Generation Partnership Project, Technical Specification Group Radio Access Network; Medium Access Control (MAC) Protocol Specification (Release 6), 3GPP TS 25.321, V6.17.0, (Dec. 2008).
Third Generation Partnership Project, Technical Specification Group Radio Access Network; Medium Access Control (MAC) protocol specification (Release 6), 3GPP TS 25.321 V6.13.0 (Jun. 2007).
Third Generation Partnership Project, "Technical Specification Group Radio Access Network; Physical Channels And Mapping Of Transport Channels Onto Physical Channels (FDD) (Release 7)", TS 25.211, V7.3.0, (Sep. 2007).
Third Generation Partnership Project; "Technical Specification Group Radio Access Network; UTRAN lub/lur interface user plane protocol for DCH data streams (Release 5)," 3GPP TS 25.427 V5.5.0 (Jun. 2005).
Third Generation Partnership Project; "Technical Specification Group Radio Access Network; UTRAN lub/lur interface user plane protocol for DCH data streams (Release 6)," 3GPP TS 25.427 V6.8.0 (Dec. 2006).
Third Generation Partnership Project; "Technical Specification Group Radio Access Network; UTRAN lub/lur interface user plane protocol for DCH data streams (Release 7)," 3GPP TS 25.427 V7.3.0 (Dec. 2006).
Third Generation Partnership Project; "Technical Specification Group Radio Access Network; UTRAN lub/lur interface user plane protocol for DCH data streams (Release 7)," 3GPP TS 25.427 V7.5.0 (Sep. 2008).

(56) References Cited

OTHER PUBLICATIONS

Third Generation Partnership Project; "Technical Specification Group Radio Access Network; UTRAN lub/lur interface user plane protocol for DCH data streams (Release 4)," 3GPP TS 25.427 V4.5.0 (Dec. 2003).
Third Generation Partnership Project; "Technical Specification Group Radio Access Network; UTRAN lub/lur interface user plane protocol for DCH data streams (Release 1999)," 3GPP TS 25.427 V3.11.0 (Dec. 2003).
Third Generation Partnership Project; "Technical Specification Group Radio Access Network; UTRAN lur interface user plane protocols for Common Transport Channel data streams (Release 1999)," 3GPP TS 25.425 V3.8.0 (Dec. 2003).
Third Generation Partnership Project; "Technical Specification Group Radio Access Network; UTRAN lur interface user plane protocols for Common Transport Channel data streams (Release 4)," 3GPP TS 25.425 V4.4.0 (Dec. 2003).
Third Generation Partnership Project; "Technical Specification Group Radio Access Network; UTRAN lur interface user plane protocols for Common Transport Channel data streams (Release 5)," 3GPP TS 25.425 V5.8.0 (Jun. 2005).
Third Generation Partnership Project; "Technical Specification Group Radio Access Network; UTRAN lub/lur interface user plane protocol for DCH data streams (Release 5)," 3GPP TS 25.427 V8.1.0 (Dec. 2008).
Third Generation Partnership Project; Technical Specification Group Radio Access Network; Medium Access Control (MAC) protocol specification (Release 7) 3GPP TS 25.321 V7.2.0, Sep. 2006 (ETSI TS 125 321 V7.2.0 (Sep. 2006).
Third Generation Partnership Prorgam Support Team, "Current Minutes of the 59bis TSG-RAN WG2 Meeting (Shanghai, China, Oct. 8-12, 2007)", TSG-RAN WG2 Meeting #60, R2-7xxxx, (Korea, Nov. 5-9, 2007).
TSG-RAN-WG2, "Reply LS on Enhanced Uplink for CELL_FACH state in FDD," 3GPP TSG-RAN-WG2 Meeting #60, R2-075472 (Nov. 5-9, 2007).
Universal Mobile Telecommunications System (UMTS); Utran lub interface Node B Application Part (NBAP) signalling (3GPP TS 25.433 version 8.3.0 Release 8), ETSI TS 125 433 V8.3.0 (ETSI version dated Feb. 2009); (3GPP version dated Dec. 2008).
Universal Mobile Telecommunications System (UMTS); UTRAN lub interface Node B Application Part (NBAP) signalling, (3GPP TS 25.433 version 7.6.0 Release 7), ETSI TS 125 433 V7.6.0 (ETSI version dated Oct. 2007); (3GPP version dated Sep. 2007).
Universal Mobile Telecommunications System (UMTS); UTRAN lub interface Node B Application Part (NBAP) signalling, (3GPP TS 25.433 version 7.7.0 Release 7), ETSI TS 125 433 V7.7.0 (ETSI version dated Jan. 2008); (3GPP version dated Dec. 2007).
Ericsson et al., "Correction in release of common E-DCH resources," 3GPP TSG-RAN WG2 Meeting #72, R2-106081, (Nov. 2010).
Ericsson et al., "Hybrid ARQ text proposal for Section 7 of TR25.896," TSG-RAN WG1 #31, R1-030208 (Feb. 2002).
Nokia, "Solution on lur Problem with pre-Rel7 SRNC," 3GPP TSG-RAN WG3 Meeting #55, R3-070278 (Feb. 2007).
Third Generation Partnership Project; Technical Specification Group Radio Access Network; Radio Resource Control (RRC); Protocol Specification (Release 8), 3GPP TS 25.331 V8.0.0 (Sep. 2007).
Third Generation Partnership Project; Technical Specification Group Radio Access Network; Radio Resource Control (RRC); Protocol Specification (Release 8), 3GPP TS 25.331 V8.4.0 (Sep. 2008).
LG Electronics Inc., "Correction to handling of same priority logical channels," 3GPP TSG-RAN WG2 Meeting #53, Tdoc R2-061494, Shanghai, China, (May 8-12, 2006).
Third Generation Partnership Project, Technical Specification Group Radio Access Network; Evolved Universal Terrestrial Radio Access (E-UTRA); Physical layer procedures (Release 8), 3GPP TS 36.213 V8.1.0 (Nov. 2007).

Third Generation Partnership Project, Technical Specification Group Radio Access Network; Evolved Universal Terrestrial Radio Access (E-UTRA); Physical layer procedures (Release 8), 3GPP TS 36.213 V8.5.0 (Dec. 2008).
Third Generation Partnership Project, Technical Specification Group Radio Access Network; Evolved Universal Terrestrial Radio Access (E-UTRA) Medium Access Control (MAC) protocol specification (Release 8), 3GPP TS 36.321 V8.3.0 (Sep. 2008).
Third Generation Partnership Project; Technical Specification Group Radio Access Network; Evolved Universal Terrestrial Radio Access (E-UTRA) Radio Resource Control (RRC); Protocol specification (Release 8), 3GPP TS 36.331 V8.0.0 (Dec. 2007).
Nokia Corporation et al., "Introduction of Enhanced Uplink in CELL_FACH state and Idle mode in 25.321," 3GPP TSG-RAN WG2 Meeting #63, R2-084689, Jeju, Korea, (Aug. 18-22, 2008).
InterDigital, "Deletion of Duplicate Definition of CELL_FACH HS-DSCH Variables," 3GPP TSG-WG2 Meeting #62bis, R2-084078, Jeju, South Korea, (Aug. 18-22, 2008).
InterDigital, "CQI Reporting and PDCCH Reception During DRX," 3GPP TSG RAN WG2 #63, R2-084080, Jeju, Korea, (Aug. 18-22, 2008).
InterDigital, "RLC UMD PDU formats with LI," R2-084081, 3GPP TSG-RAN WG2#63, Jeju, Korea (Aug. 18-22, 2008).
InterDigital, "Counting PDU/PDU Segment Retransmissions for RLC Re-establishment," R2-084082, 3GPP TSG RAN WG2 #63, Jeju, Korea (Aug. 18-22, 2008).
InterDigital, "PDCP RLC Behavior at Non-Handover RLC Re-establishment," R2-084083, 3GPP TSG RAN WG2 #63, Jeju, Korea (Aug. 18-22, 2008).
InterDigital, "Deletion of Duplicate Definition of CELL_FACH HS-DSCH Variables," R2-084084, 3GPP TSG-WG2 Meeting #63, Jeju, South Korea (Aug. 18-22, 2008).
InterDigital, "RRC procedures for configuring Improved layer 2 for UL," R2-084085, 3GPP TSG-WG2 Meeting #62bis, R2-084085, Warsaw, Poland (Jun. 30-Jul. 4, 2008).
InterDigital, "HARQ entities in DC-HSDPA," R2-084136, 3GPP TSG-RAN WG2#63, Jeju Island, South Korea (Aug. 18-22, 2008).
InterDigital, "Happy Bit Setting with Improved L2 for UL," R2-084137, 3GPP TSG-RAN WG2 Meeting #63, Jeju, South Korea, (Aug. 18-22, 2008).
InterDigital, "TEBS definition update for MAC-i/is," R2-084138, 3GPP TSG-WG2 Meeting #62bis, Jeju, South Korea, (Aug. 18-22, 2008).
InterDigital, "Triggering of Cell Reselection in CELL_FACH," Tdoc R2-084139, 3GPP TSG-RAN WG2#63, Jeju Island, Korea (Aug. 18-22, 2008).
InterDigital, "RRC procedures for configuring Improved layer 2 for UL," R2-084665, 3GPP TSG-WG2 Meeting #63, Jeju, Korea, (Aug. 18-22, 2008).
InterDigital et al., "Happy Bit Setting with Improved L2 for UL," R2-084682, 3GPP TSG-WG2 Meeting #63, Jeju, South Korea, (Aug. 18-22, 2008).
InterDigital, "Triggering of cell reselection in Cell_FACH," R2-084692, 3GPP TSG-RAN WG2 #63, Jeju, Korea, (Aug. 18-22, 2008).
InterDigital et al., "Addition of HS-DPCCH feedback in CELL_FACH," R2-086934, 3GPP TSG-WG2 Meeting #64, Prague, Czech Republic (Nov. 10-14, 2008).
ETSI MCC, "Report of 3GPP TSG RAN WG2 meeting #64," R2-090810, TSG-RAN Working Group 2 meeting #64bis, Ljubljana, Slovenia, (Jan. 12-16, 2008).
Third Generation Partnership Project; Technical Specification Group Radio Access Network; Evolved Universal Terrestrial Radio Access (E-UTRA) Radio Resource Control (RRC); Protocol specification (Release 8), 3GPP TS 36.331 V8.4.0 (Dec. 2008).
Siemens: "Sending SMS to the group call", 3GPP Draft; GP-062467_44018, 3rd Generation Partnership Project (3GPP), Mobile Competence Centre ; 650, Route Des Lucioles ; F-06921 Sophia-Antipolis Cedex ; France, vol. TSG Geran, No. Sophia; Nov. 16, 2006, (Nov. 16, 2006).
Third Generation Partnership Project, "Technical Specification Group Radio Access Network; Evolved Universal Terrestrial Radio Access

(56) References Cited

OTHER PUBLICATIONS (E-UTRA) and Evolved Universal Terrestrial Radio Access Network (E-UTRAN); Overall description; Stage 2 (Release 8)," 3GPP TS 36.300 V8.2.0 (Sep. 2007).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.6.0 (Sep. 2008).
Third Generation Partnership Project, "Technical Specification Group Radio Access Network; Physical layer procedures (FDD) (Release 8)," 3GPP TS 25.214 V8.0.0 (Nov. 2007).
Third Generation Partnership Project, "Technical Specification Group Radio Access Network; Physical layer procedures (FDD) (Release 8)," 3GPP TS 25.214 V8.4.0 (Dec. 2008).
Third Generation Partnership Project, "Technical Specification Group Radio Access Network; High Speed Downlink Packet Access (HSDPA); Overall description; Stage 2," (Release 7), 3GPP TS 25.308 V7.4.0 (Sep. 2007).
Third Generation Partnership Project, "Technical Specification Group Radio Access Network; High Speed Downlink Packet Access (HSDPA); Overall description; Stage 2," (Release 7), 3GPP TS 25.308 V8.3.0 (Sep. 2008).
Third Generation Partnership Project, "Technical Specification Group Radio Access Network; User Equipment (UE) procedures in idle mode and procedures for cell reselection in connected mode (Release 7)," 3GPP TS 25.304 V7.3.0 (Sep. 2007).
Third Generation Partnership Project, "Technical Specification Group Radio Access Network; User Equipment (UE) procedures in idle mode and procedures for cell reselection in connected mode (Release 7)," 3GPP TS 25.304 V8.3.0 (Sep. 2008).
Panasonic, "Inclusion of additional data on RACH," R1-060699, TSG-RAN WG1 Meeting#44 (Feb. 2006).
Chen et al., "Researches on Collision Resolution Technologies in Random Access Wireless Networks," Jiangsu Communication Technology, No. 03 (Apr. 25, 2003). (English abstract provided).
Chinese Office Action dated Nov. 3, 2022 for Chinese Patent Application No. 201910062027.6.
3gpp.org ftp Specs archive 25_series, Available at: https://web.archive.org/web/20070815120847/http://www.3gpp.org/ftp/Specs/archive/25_series/ (2007).
www.3gpp.org—/ftp/Specs/archive/25_series/, Available at: https://web.archive.org/web/20070815120847/http://www.3gpp.org/ftp/Specs/archive/25_series/ (2007).
U.S. Appl. No. 60/985,537, filed Nov. 5, 2007.
www.3gpp.org—/ftp/Specs/latest/Rel-7/, Available at: https://web.archive.org/web/20070901000642/http://www.3gpp.org/ftp/Specs/latest/Rel-7/ (2007).
www.3gpp.org—/ftp/Specs/latest/, Available at: https://web.archive.org/web/20070901000715/http://www.3gpp.org/ftp/Specs/latest/ (2007).
TSG Organization, 3rd Generation Partnership Project (3GPP), Available at: https://web.archive.org/web/20070705003208/http://www.3gpp.org/tb/home.htm (2007).
3GPP home page, Available at: https://web.archive.org/web/20070707102325/http://www.3gpp.org/ (2007).
RAN2 Homepage, Available at: https://web.archive.org/web/20070710032216/http://www.3gpp.org/tb/RAN/RAN2/RAN2.htm (2007).
www.3gpp.org—/ftp/tsg_ran/WG2_RL2/, Available at: https://web.archive.org/web/20070701154418/http://www.3gpp.org/ftp/tsg_ran/WG2_RL2/ (2007).
www.3gpp.org—/ftp/tsg_ran/WG2_RL2/TSGR2_55/, Available at: https://web.archive.org/web/20071129220816/http://www.3gpp.org/ftp/tsg_ran/WG2_RL2/TSGR2_55/ (2007).
www.3gpp.org—/ftp/Specs/, Available at: https://web.archive.org/web/20070818015343/http://www.3gpp.org/ftp/Specs (2007).
3GPP Specifications Home Page, Available at: https://web.archive.org/web/20070820091849/http://www.3gpp.org:80/specs/specs.htm (2007).

3GPP Specifications—Numbering scheme, https://web.archive.org/web/20070810002551/http://www.3gpp.org/specs/numbering.htm (2007).
3GPP specification series: 25series, https://web.archive.org/web/20070810232434/http://www.3gpp.org/ftp/Specs/html-info/25-series.htm (2007).
3GPP Specification Release version matrix, Available at: https://web.archive.org/web/20070905143259/http://www.3gpp.org/ftp/Specs/html-info/SpecReleaseMatrix.htm (2007).
3GPP specifications per WG: R2 (showing rapporteur), Available at: https://web.archive.org/web/20070525204220/http://www.3gpp.org/ftp/Specs/html-info/TSG-WG --R2.htm (2007).
www.3gpp.org—/ftp/Specs/latest/Rel-7/, Available at: https://web.archive.org/web/20070602105532/http://www.3gpp.org/ftp/Specs/latest/Rel-7/ (2007).
www.3gpp.org—/ftp/Specs/latest/Rel-7/25_series/, Available at: https://web.archive.org/web/20070907224517/http:/www.3gpp.org:80/ftp/Specs/latest/Rel-7/25_series/ (2007).
www.3gpp.org—/ftp/specs/latest/, Available at: https://web.archive.org/web/20070704003509/http://www.3gpp.org/ftp/specs/latest/ (2007).
Join or Leave the 3GPP_TSG_RAN_WG2 List, Available at: https://web.archive.org/web/20060105222647/http://list.etsi.org/scripts/wa.exe?SUBED1=3gpp_tsg_ran_wg2&A=1 (2006).
3GPP Specifications per TSG/WG, 3GPP Specifications for group: R2 (showing rapporteur), Available at: https://web.archive.org/web/20070525204220/http://www.3gpp.org:80/ftp/Specs/html-info/TSG-WG--R2.htm (2007).
Listserv, 3GPP_TSG_RAN_WG2 Archives, [RAN2#59] Contributions (2007).
List Archives at list.etsi.org, Available at: https://web.archive.org/web/20070714151920/http://list.etsi.org/ (2007).
List archives at list.etsi.org, Available at: https://web.archive.org/web/20070816051307/http://list.etsi.org/ (2007).
www.3gpp.org—/ftp/tsg_ran/WG2_RL2/TSGR2_59/Docs/, Available at: https://web.archive.org/web/20080719190403/http://www.3gpp.org/ftp/tsg_ran/WG2_RL2/TSGR2_59/Docs/ (2008).
NSN et al., "Further discussion on enhanced CELL_FACH in REL8," R2-073254 (2007).
3GPP Support Team, "Draft0 minutes of the 59 TSG-RAN WG2 meeting" (2007).
Directory Listing /ftp/tsg_ran/WG2_RL2/TSGR2_59/Minutes, Available at: https://www.3gpp.org/ftp/tsg_ran/WG2_RL2/TSGR2_59/Minutes (2007).
www.3gpp.org—/ftp/Specs/archive/, Available at: https://web.archive.org/web/20070815092224/http://www.3gpp.org:80/ftp/Specs/archive/ (2007).
3GPP Support Team, "Draft3 minutes of the 59 TSG-RAN WG2 meeting" R2-074444 (2007).
www.etsi.org—/deliver/etsi_ts/125300_125399/125321/07.05.00_60/, Available at: https://www.etsi.org/deliver/etsi_ts/125300_125399/125321/07.05.00_60/ (2007).
3GPP Specification Release version matrix, Available at: https://web.archive.org/web/20071112134824/http://www.3gpp.org/ftp/Specs/html-info/SpecReleaseMatrix.htm (2007).
3GPP specifications—List of all specification numbers and titles (2002).
Third Generation Partnership Project, Universal Mobile Telecommunications System (UMTS); Medium Access Control (MAC) protocol specification (3GPP TS 25.321 version 7.6.0 Release 7), ETSI TS 125 321 v7.6.0. (Oct. 2007).
Rapporteur, NSN, Markus Wimmer, TSG-RAN meeting #40; RP-080266; Status Report for WI to TSG; Prague, Czech Republic; (May 27-30, 2008).
Third Generation Partnership Project, "Technical Specification Group Radio Access Network; Evolved Universal Terrestrial Radio Access (E-UTRA) Medium Access Control (MAC) protocol specification (Release 8)." 3GPP TS 36.321 V8.0.0 (Dec. 2007).
R2-073473 MAC protocol specification baseline (2007).
Motorola A920 Review, Available at: https://www.trustedreviews.com/reviews/motorola-a920 (2003).
Wikipedia, Nokia 6650, Available at: https://web.archive.org/web/20071215043537/https://en.wikipedia.org/wiki/Nokia_6650 (Dec. 15, 2007).

(56) References Cited

OTHER PUBLICATIONS

Nokia Museum, Nokia 6650, Available at: https://web.archive.org/web/20220928102700/https://nokiamuseuminfo.wordpress.com/2003/09/26/nokia-6650/ (2003).

Nokia 6650 Service Manual, Available at: https://www.manualslib.com/manual/2297649/Nokia-6650.html#manual (2003).

Mobile Phone Museum, Motorola A920, Available at: https://www.mobilephonemuseum.com/phone-detail/a920 (2003).

Motorola, Level 3 Service Manual, Draft 1.1, Available at: http://altehandys.de/downloads/ser-man-mo-a920.pdf (2003).

Mobile Review, LG K8000, Available at: https://www.mobile-review.com/preview/lg-k8000-en.shtml (2003).

ETSI MCC, Report of the 60bis TSG-RAN WG2 Meeting, R2-080676, (2008).

"Additional cases of MAC-ehs reset for UEs operating in Enhanced CELL_FACH", 3GPP TSG-WG2 Meeting #59, R2-073739, Athens, Greece, Aug. 20-24, 2007.

\* cited by examiner

METHOD AND APPARATUS SUPPORTING RANDOM ACCESS TRANSMISSIONS

CROSS REFERENCE TO RELATED APPLICATIONS

This application is a continuation of U.S. patent application Ser. No. 16/440,886, filed Jun. 13, 2019, which is a continuation of U.S. patent application Ser. No. 15/782,532, filed on Oct. 12, 2017, which issued as U.S. Pat. No. 10,327,188 on Jun. 18, 2019, which is a continuation of U.S. patent application Ser. No. 15/135,616, filed on Apr. 22, 2016, which is a continuation of U.S. patent application Ser. No. 14/875,059, filed on Oct. 5, 2015, which is a continuation of U.S. patent application Ser. No. 13/665,734, filed on Oct. 31, 2012, which issued as U.S. Pat. No. 9,161,285 on Oct. 13, 2015, which is a continuation of U.S. patent application Ser. No. 12/346,631, filed on Dec. 30, 2008; which issued as U.S. Pat. No. 8,325,684 on Dec. 4, 2012, which claims the benefit of U.S. Provisional Application Ser. No. 61/018,567, filed on Jan. 2, 2008, which are incorporated by reference as if fully set forth. This application is related to co-pending U.S. patent application Ser. No. 17/099,386, filed Nov. 16, 2020.

BACKGROUND

Wireless communication systems are well known in the art. Communications standards are developed in order to provide global connectivity for wireless systems and to achieve performance goals in terms of, for example, throughput, latency and coverage. One current standard in widespread use, called Universal Mobile Telecommunications Systems (UMTS), was developed as part of Third Generation (3G) Radio Systems, and is maintained by the Third Generation Partnership Project (3GPP).

An example UMTS system architecture in accordance with current 3GPP specifications is depicted in FIG. 1. The UMTS network architecture includes a Core Network (CN) interconnected with a UMTS Terrestrial Radio Access Network (UTRAN) via an Iu interface. The UTRAN is configured to provide wireless telecommunication services to users through wireless transmit receive units (WTRUs), referred to as user equipments (UEs) in the 3GPP standard, via a Uu radio interface. A commonly employed air interface defined in the UMTS standard is wideband code division multiple access (W-CDMA). The UTRAN has one or more radio network controllers (RNCs) and base stations, referred to as Node Bs by 3GPP, which collectively provide for the geographic coverage for wireless communications with WTRUs. One or more Node Bs is connected to each RNC via an Iub interface; RNCs within a UTRAN communicate via an Iur interface.

WTRUs in a UMTS Terrestrial Radio Access Network (UTRAN) can be in either of two modes: Idle or Connected. Based on WTRU mobility and activity while in connected mode, the UTRAN can direct the WTRU to transition between a number of sub-states, e.g., CELL_PCH, URA_PCH, CELL_FACH, and CELL_DCH. User Plane communication between the WTRU and the UTRAN is only permitted while in CELL_FACH and CELL_DCH state. The Cell_DCH state is characterized by dedicated channels (DCHs) in both the uplink (UL) and the downlink (DL). On the WTRU side, this corresponds to continuous transmission and reception and can be demanding on user power requirements. The CELL_FACH state does not use DCHs and thus allows better power consumption, at the expense of a lower uplink and downlink throughput.

The CELL_FACH is well-suited for signaling traffic (for example, the transmission of CELL/URA UPDATE messages), and for applications requiring very low uplink throughput. In CELL_FACH, uplink communication is achieved through a random access transport channel (RACH) mapped to a packet random access channel (PRACH) physical channel. The RACH is a contention based protocol with a power ramp-up procedure to acquire the channel and to adjust transmit power.

Downlink communication is through a shared Forward Access Transport Channel (FACH) mapped to a secondary common control physical channel (S-CCPCH) or through the high speed downlink channel.

Mobility is handled autonomously by the WTRU in CELL_FACH. The currently soft handover does not (as of Release 6 of the standard) exist within CELL_FACH. As such, the WTRU independently takes measurements, and determines when to make cell reselections.

System information during CELL_FACH is read from a broadcast channel (BCH). This information includes the setup details for the uplink RACH, the downlink FACH and the high speed downlink shared channel (HS-DSCH)) channels to be used in CELL_FACH.

Recent work by the standardization bodies has identified reuse of an Enhanced-DCH (E-DCH) in the CELL_FACH state. Enhanced-DCH is a feature that was introduced to increase uplink throughput. The E-DCH operates on a request/grant principle. WTRUs send an indication of the requested capacity they require through a combination of mechanisms, while the network responds with grants to these requests. These grants are generally generated by a Node B scheduler.

At the same time, Hybrid Automatic Repeat Requests (HARQs) are used in connection with the physical layer transmissions. To facilitate the above mechanisms, two new UL physical channels have been introduced, an Enhanced-Dedicated Physical Control Channel (E-DPCCH) for control, and an Enhanced-Dedicated Physical Data Channel (E-DPDCH) for data. Three new downlink (DL) physical channels, two for transmission of grants and one for fast physical layer acknowledgements (Layer 1 ACK/NACK), were also introduced. The Node B, therefore, is permitted to issue both absolute grants and relative grants. Grants are signaled in terms of a power ratio. Each WTRU maintains a serving grant, which it can convert to a payload size. For Release 6 WTRUs, mobility is handled by the network through soft handover and active sets.

In addition to the new channels at the physical layer, E-DCH is also required at the Medium Access Control (MAC) layer, with the introduction of new MAC-e/es protocol entities to handle the Enhanced Dedicated Transport Channel (E-DCH).

One of the concerns with the use of E-DCH in CELL_FACH is the interaction of the uplink procedure with the mobility procedure, in particular, the cell reselection procedure. This procedure can either remain WTRU autonomous or could be network assisted in some way. In both cases, the network and WTRU actions upon a cell reselection need to be defined. On the WTRU side, actions have to be specified to deal with the medium access control entities (MAC-e/es), hybrid automatic repeat request (HARQ) buffers, MAC Transmission Sequence Numbers (TSN), and the like. With respect to the network, a serving radio network controller (SRNC) may need to be made aware when a new enhanced radio network temporary identifier (E-RNTI) has been assigned by a controlling radio network controller (CRNC). The network may also have to deal with releasing the resources in the source cell.

Accordingly, there exists a need for a method and apparatus to address reselection for WTRUs capable of using the E-DCH while in Cell_FACH state.

SUMMARY

A method and wireless transmit receive unit (WTRU) are disclosed that is configured to perform cell reselection to another cell. When the WTRU is in a CELL_FACH state using an Enhanced-Dedicated Channel (E-DCH). The cell reselection can be network assisted based on WTRU measurements reported to the network. Alternatively, the cell reselection can be WTRU based.

BRIEF DESCRIPTION OF THE DRAWINGS

A more detailed understanding of the method may be had from the following description, given by way of example and to be understood in conjunction with the accompanying drawing.

DETAILED DESCRIPTION

When referred to hereafter, the terminology "wireless transmit/receive unit" ("WTRU") includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node B, a site controller, an access point (AP), or any other type of interfacing device capable of operating in a wireless environment. When referred to hereafter, the terminology "E-DCH system information" includes but is not limited to E_DCH information that is broadcast by the Node B as part of its system information. This may include information for a set of shared E-DCH resources that are assigned by the NodeB and shared by WTRUs in CELL_FACH state. The terminology enhanced random access channel (E-RACH) refers to the enhanced uplink mechanism used in CELL_FACH state, including, but not limited to the use of Enhanced-DCH resources.

A Medium Access Control (MAC) layer is divided into several entities; MAC-e/es protocol entities are preferably provided to handle an Enhanced Dedicated Transport Channel (E-DCH). Generally, the expression "MAC-is", "MAC-i", and "MAC-is/i" may be substituted for "MAC-es", "MAC-e" and "MAC-es/e" respectively. "MAC-es/e reset" procedure may be replaced by "MAC-is/i reset" procedure where the "MAC-is/i reset" procedure refers to a procedure similar to "MAC-es/e reset" with the possible additional step that segmentation buffers are flushed.

Figure 1:
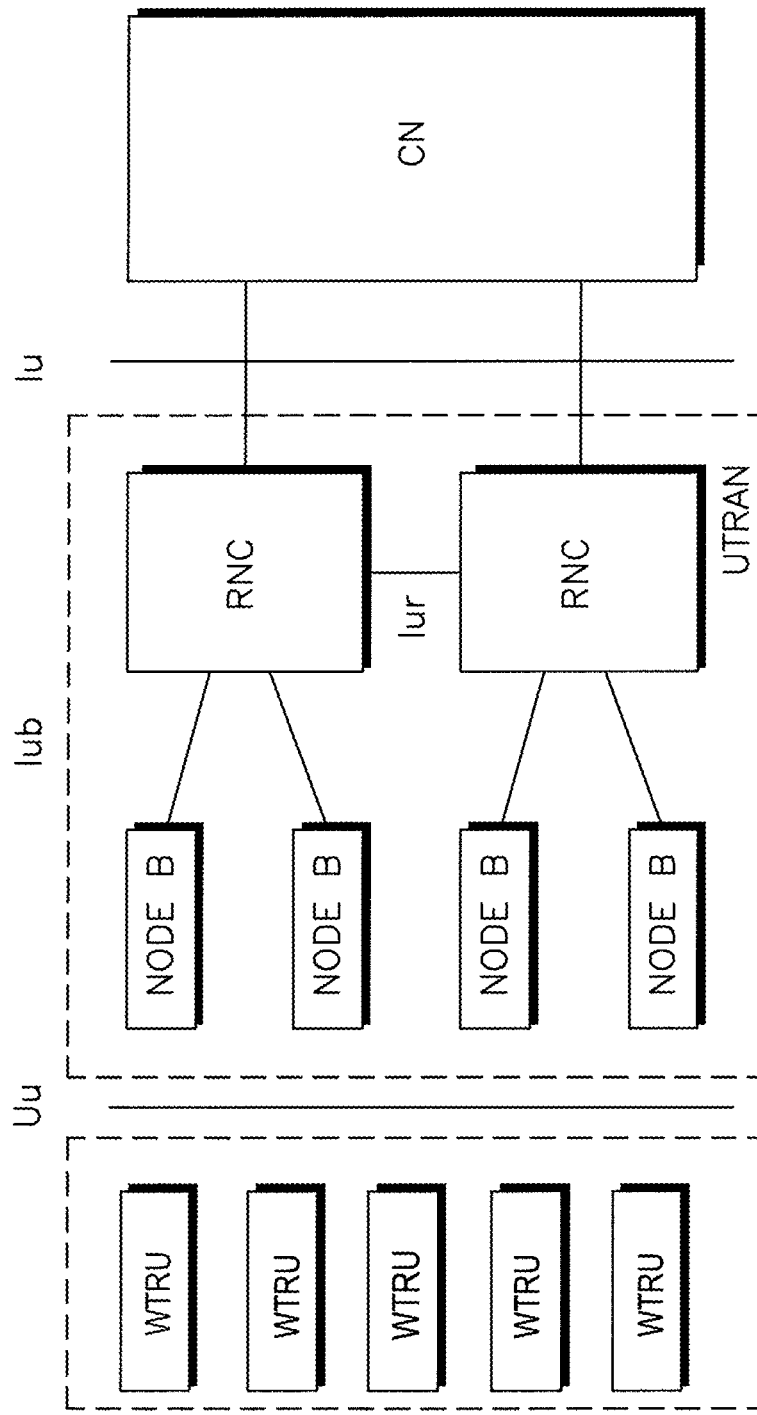
FIG. 1 is a block diagram of an overview of the system architecture of a conventional UMTS network.
Figure 2:
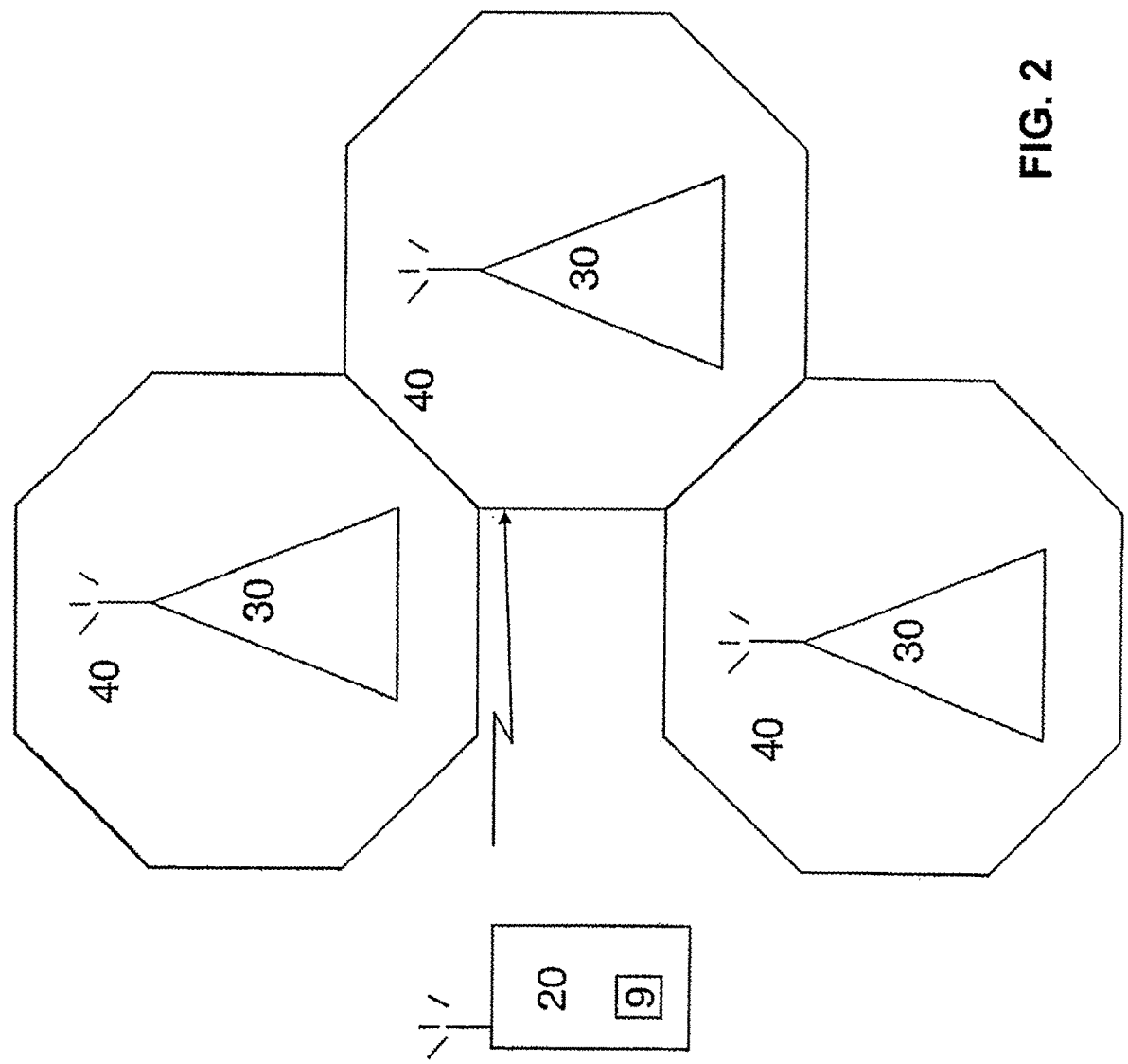
FIG. 2 is a block diagram of a wireless communication system.

Referring to FIG. 2, a HSPA wireless communication network (NW) 10 comprises a WTRU 20, one or more Node Bs 30, and one or more cells 40. Each cell 40 comprises one or more Node Bs (NB or eNB) 30. WTRU 20 comprises a processor 9 configured to implement the cell reselection method disclosed hereafter.

In accordance with a disclosed method, WTRU 20 performs autonomous cell reselection, with the MAC-es, used for common control channel (CCCH) data or common traffic, terminated at a Controlling RNC (CRNC). Accordingly, the MAC-es entity is associated with a common E-DCH resource set used by WTRU 20, or a common Enhanced-Radio Network Temporary Identifier (E-RNTI) that is selected by WTRU 20. Preferably, the MAC-es for dedicated traffic (i.e., DCCH or DTCH) is terminated in a serving RNC (SRNC) and is associated with a WTRU 20. Alternatively, the MAC-es for dedicated traffic is also terminated in the CRNC.

Figure 3:
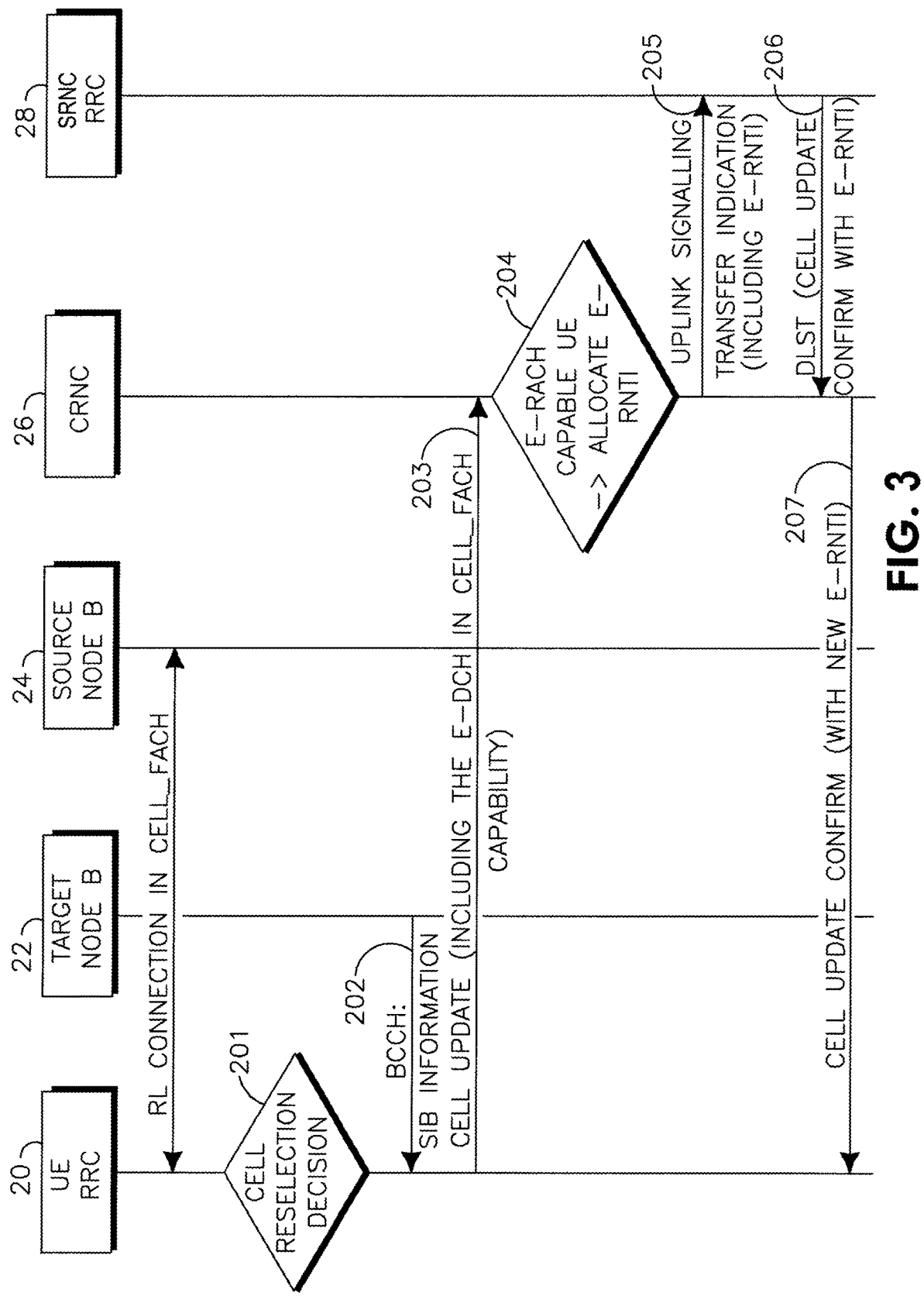
FIG. 3 is a timing diagram illustrating a CELL_UPDATE procedure with a MAC-es included in the controlling radio network controller (CRNC).

According to this disclosed method, WTRU 20 uses internal measurements to make cell reselection decisions. FIG. 3 is a signal diagram of the method that may be used by WTRU 20 when a target cell is selected in the CELL_FACH state. Upon determining to perform a cell reselection, WTRU 20 ceases transmitting and receiving from source Node B 22, and clears the variable enhanced radio network temporary identifier (E-RNTI) that was assigned to WTRU 20 by controlling radio network controller 26.

If WTRU 20 is transmitting in the uplink (UL) when it determines that a cell reselection is to be performed, then prior to moving to the target cell, the WTRU 20 completes transmission for all hybrid access request (HARQ) processes that are active. WTRU 20 may also stop monitoring the downlink (DL) E-DCH channels in the source cell (and, if applicable, in the neighboring cells as well).

In an alternative, WTRU 20 may reset Transmission Sequence Numbers (TSNs) associated with the common control channel (CCCH) logical channel in the MAC-es and flush the HARQ processes if UL data is present in the HARQ processes. Alternatively, WTRU 20 can autonomously perform a complete reset of the MAC-es/e entity (i.e., reset TSN, flush HARQ processes, and discard any remaining segments if applicable).

WTRU 20 then receives system information blocks from target Node B 22 in the broadcast control channel 202. If the E-DCH information element (IE) (referred to herein as E-DCH system information) is broadcasted in the target cell system information blocks (SIBs), WTRU 20 starts a new preamble ramp-up phase in target cell using the broadcasted E-DCH RACH preamble sequences. The presence of this E-DCH system information indicates to WTRU 20 that the cell supports E-DCH in CELL_FACH. E-RACH access, therefore, can be achieved using a common, shared, or randomly chosen WTRU ID.

After a successful acquisition, WTRU 20 is assigned a set of E-DCH resources for use in the target cell. WTRU 20 then sends a CELL_UPDATE message 203 in the target cell over the assigned E-DCH resource, to controlling RNC 26 (CRNC). Since the MAC-es for CCCH ends in CRNC 26, the CELL_UPDATE message can be read and decoded by CRNC 26. WTRU 20 may include an information element (IE) indicating the E-DCH in CELL_FACH capability in CELL_UPDATE message 203 (e.g., IE "E-DCH in CELL_FACH"). This IE may be an enumerated IE. If the E-DCH in CELL_FACH IE is present, the WTRU supports E-DCH in CELL_FACH. The absence of the IE indicates that the WTRU 20 does not support E-DCH in CELL_FACH. Alternatively, the E-DCH in CELL_FACH IE can be set to TRUE or FALSE to indicate whether the WTRU has E-DCH in CELL_FACH capable.

Alternatively, the E-DCH capability is implicitly detected by CRNC 26. If CRNC 26 receives the CELL_UPDATE 203 message via an E-RACH Iub frame protocol, CRNC 26 implicitly determines that WTRU 20 supports E-DCH in CELL_FACH.

CRNC 26 may alternatively check the sub-layer from which the packet was received. If delivered from the MAC-es entity, CRNC 26 determines that WTRU 20 supports E-DCH in CELL_FACH. Otherwise, WTRU 20 does not support E-DCH in CELL_FACH.

In another alternative, source Node B 24 notifies CRNC 26 that the packet was received over E-DCH. This alternative requires signaling over the Iub. As such, a new Iub message can be defined or the Node B can include the indication with the message over the Iub frame Accordingly, when CRNC 26 receives the CELL_UPDATE message 203 and determines that E-DCH in CELL_FACH is supported by WTRU 20, and also supported by CRNC 26, CRNC 26 allocates a new E-RNTI to WTRU 20. CRNC 26 then forwards the message to Serving RNC (SRNC) 28 via radio network subsystem application part (RNSAP) UL Signaling Transfer 205, including the variable E-RNTI.

Alternatively, CRNC 26 does not send an indication that WTRU 20 supports E-DCH in CELL_FACH, but relies on SRNC 28, which is aware of the WTRU 20 capabilities. As such, SRNC 28 requests CRNC 26 to allocate a "new E-RNTI" for WTRU 20, which may be accomplished, for example, via the common transport channel request.

SRNC 28 can tell source Node B that the E-DCH resources of the WTRU can be released. In the case where a MAC-e is dedicated per WTRU, the MAC-e entity may be fully released. If the MAC-e entity is present per set of E-DCH resources, the HARQ soft buffers in the source Node B are flushed, but not necessarily released. If a MAC-e/es reset is autonomously performed every time a cell reselection is performed, the MAC-es entity in the SRNC, associated with the WTRU performing the reselection, also has to be reset.

SRNC 28, upon receiving the message from CRNC 26, generates a CELL_UPDATE_CONFIRM message 206, 207, including a new E-RNTI for use in CELL_FACH state. This message may be used by the network to assign E-DCH resources. Alternatively, any E-DCH resources are allocated by target Node B 22 after a preamble power ramp-up performed when WTRU 20 needs to transmit additional traffic.

Upon receiving the CELL_UPDATE_CONFIRM message 207, WTRU 20 stores the new E-RNTI for use in future uplink access.

Alternatively, if WTRU 20 does not autonomously perform a MAC-e/es reset as disclosed above, the network may explicitly request a MAC-e/es reset to be performed by WTRU 20. The network may request a reset of the MAC-e/es entity in WTRU 20 following SRNS relocation, every time a cell reselection is performed, when a reconfiguration occurs, or when the dedicated MAC-es needs to be released or reset.

In accordance with this method, a MAC-e/es reset may be performed by adding a new IE "MAC-e/es reset" indicator in the CELL_UPDATE_CONFIRM message. Upon reception of the indicator by WTRU 20, WTRU 20 performs a full reset of the MAC-e/es (i.e., reset TSN and flush HARQ processes). If applicable, WTRU 20 may discard any remaining segments in the MAC. The MAC-e/es may also be reset by WTRU 20 autonomously resetting the MAC-e/es when WTRU 20 receives a CELL_UPDATE_CONFIRM and at least one of the following conditions are true: a SRNS relocation has been performed, which may be detected when the IE "new U-RNTI" is present in the CELL_UPDATE_CONFIRM; a reconfiguration of MAC protocol occurs within the CELL_UPDATE_CONFIRM; or a reconfiguration of the radio link control (RLC) protocol occurs.

Each of the above mentioned methods of resetting the MAC-e/es may be performed alone or in combination with one another. WTRU 20 may also perform a partial MAC-e/es reset, where the TSN number is set to zero for the logical channel CCCH when the CELL_UPDATE_CONFIRM message is received.

In accordance with an alternative method of autonomous cell reselection, the UTRAN MAC-e and MAC-es entities are both at the Node B. As a result, the E-DCH transmission for CELL_FACH WTRUs terminates at the Node B. A WTRU, therefore, is configured to make a cell reselection decision based on internal measurements with respect to a new target cell selected as part of cell reselection.

WTRU 20 ceases transmitting to and receiving from the source cell and stops monitoring the downlink (DL) E-DCH channels in source cell. If the WTRU is transmitting in the UL, prior to moving to the target cell, WTRU 20 may complete transmission of all HARQ processes that are active at the time it is determined that WTRU 20 is to perform a cell reselection.

WTRU 20 then performs a reset of the MAC-es/e entity (i.e., flushes HARQ buffers and resets TSN to 0 and, if applicable, may discard any remaining segments in the MAC-e/es entity). The variable E-RNTI is then cleared by WTRU 20. The target Node B transmits SIB information in the broadcast control channel to WTRU 20. If the E-DCH system information IEs are broadcasted in the target cell SIBs, WTRU 20 starts a new preamble ramp-up phase in the target cell using the E-DCH preamble sequences.

After a successful acquisition, WTRU 20 is assigned a set of E-DCH resources to use in the target cell. For collision resolution, WTRU 20 may use a common E-RNTI or a random ID chosen in the MAC header. WTRU 20 then sends a CELL_UPDATE message including the E-DCH in CELL_FACH capability indication, over the target cell to the controlling RNC. The target cell CRNC receives the CELL_UPDATE message, and when E-DCH in CELL_FACH is supported, the CRNC allocates an E-RNTI. The CRNC then forwards the message to the SRNC via Radio Network Subsystem Application Part (RNSAP) UL Signaling Transfer including the variable E-RNTI.

Alternatively, WTRU 20 does not send E-DCH in CELL_FACH capability in the CELL_UPDATE message. The SRNC, though, is aware of the WTRU capability, and therefore, requests the CRNC to allocate a new E-RNTI for WTRU 20. This may be done via the common transport channel request. The CRNC provides the new E-RNTI in the response message. Alternatively, the E-DCH capability can be implicitly detected by the CRNC. If the CRNC receives the CELL_UPDATE via an E-RACH Iub frame protocol, the CRNC can implicitly determine that the WTRU supports E-DCH in CELL_FACH. Optionally, the CRNC can check what sub-layer the packet was received from. If delivered from the MAC-es entity, the WTRU supports E-DCH in CELL_FACH, otherwise the WTRU does not.

Alternatively, the Node B can notify the CRNC that the packet was received over E-DCH. This requires signaling over the Iub. A new Iub message can be defined, or alternatively, the Node B can include the indication with the message over the Iub frame.

Optionally, the SRNC tells source Node B that the E-DCH resources from the WTRU can be released. The source Node B can also reset the UTRAN MAC-e and MAC-es and flush the HARQ soft memory buffers in the source cell.

SRNC preferably generates a CELL_UPDATE_CONFIRM message, where it optionally includes the "new E-RNTI" to be used in CELL_FACH state. The network may optionally use this message to assign a different set of E-DCH resources.

Upon reception of CELL_UPDATE_CONFIRM the WTRU stores the "new E-RNTI" and uses it for future uplink access.

Alternatively, the network can include a MAC-es/e reset indicator in the CELL_UPDATE_CONFIRM message.

In accordance with another alternative method for autonomous cell reselection, the E-DCH for a CELL_FACH WTRU terminates at a SRNC but CELL_UPDATE message is sent over a legacy (release 99) RACH.

The UTRAN MAC-es entity, in accordance with this method, is located at the SRNC and associated with a particular WTRU. The WTRU is configured to perform cell reselection using a legacy RACH procedure to transmit the CELL_UPDATE message, instead of sending the CELL_UPDATE message over an enhanced RACH in the target cell. This allows the WTRU to undergo a cell reselection without resetting the MAC-e/es entity (i.e. the WTRU does not need to flush the HARQ buffers and reset the TSN number to 0), allowing the incrementing of the TSN to continue after a cell reselection. Furthermore, this allows the WTRU to temporarily suspend E-DCH transmission while the cell reselection is being performed and to resume transmission after the reselection.

As disclosed above, the WTRU makes cell reselection decisions based on internal measurements. If, as a result of the internal measurements, a new target cell is selected, the WTRU stops transmitting in a source cell. If data is available in the HARQ processes, the WTRU stops the transmission of the HARQ processes such that the WTRU can continue with the same HARQ processes in the target cell. Alternatively, the data in the HARQ processes is flushed.

If the WTRU is transmitting in the UL, then prior to moving to the target cell, the WTRU may complete transmission of all HARQ processes that are active at the time it determines that it is to perform a cell reselection.

The WTRU then ceases monitoring the DL E-DCH channels and other downlink resources in the source cell and clears the variable E-RNTI.

The WTRU then receives the target cell PRACH information and DL information from the SIBs and transmits the CELL_UPDATE message. The CELL_UPDATE message may include the E-DCH in CELL_FACH capability indication over the Release 99 RACH of the target cell. The CELL_UPDATE message is received by the CRNC and forwarded to the SRNC. The CRNC receives the CELL_UPDATE, and allocates an E-RNTI when the WTRU is E-DCH in CELL_FACH capable. The CRNC then forwards the message, including the variable E-RNTI, to the SRNC via RNSAP UL Signaling Transfer. In the alternative, the WTRU does not send E-DCH in CELL_FACH capability in the CELL_UPDATE. Since the SRNC is aware of the WTRU capability, it requests the CRNC to allocate a new E-RNTI for the WTRU, which may be accomplished via the common transport channel request. The CRNC, therefore, provides the new E-RNTI in the response message and the SRNC includes the E-RNTI in the CELL UPDATE CONFIRM.

The SRNC generates the CELL_UPDATE_CONFIRM message, which can be used by the network to assign dedicated E-DCH resources. Alternatively, any E-DCH resources can be allocated by the target Node B after a preamble power ramp-up is performed when the WTRU needs to transmit additional traffic. The CELL_UPDATE_CONFIRM message may include the "new E-RNTI" for the WTRU.

The SRNC then informs the source Node B that the E-DCH resources of the WTRU can be released. In the case where a MAC-e is dedicated per WTRU, the MAC-e entity is also fully released. If the MAC-e entity is present per set of E-DCH resource, the HARQ soft buffers in the source Node B are flushed.

Upon reception of the CELL_UPDATE_CONFIRM message, the WTRU stores the new E-RNTI for future uplink access.

The network may explicitly request a MAC-e/es reset to be performed by the WTRU. The network may request a reset of the MAC-e/es entity in the WTRU following the occurrence of SRNS relocation, the performance of cell reselection, and the occurrence of a reconfiguration.

In accordance with this method, a MAC-e/es reset may be performed by adding a new IE "MAC-e/es reset" indicator in the CELL_UPDATE_CONFIRM message. Upon reception of the indicator by the WTRU, the WTRU performs a full reset of the MAC-e/es (i.e., reset TSN, flush HARQ processes). If applicable, WTRU 20 may discard any remaining segments in the MAC. The MAC-e/es may also be reset by sending a special reset that only flushes the HARQ buffers without altering the TSN used for reordering. The MAC-e protocol data units (PDUs) that are in the HARQ buffers would require retransmission from some higher layer protocol.

Alternatively SRNC can send a special reset signal telling the WTRU to restart all currently active HARQ processes in the target cell. The network then informs the source Node B that E-DCH resources in the source cell can be released. The network can also prepare the E-DCH resources in the target cell.

Alternatively, the WTRU can autonomously perform a reset after completing transmission of all HARQ processes (using any of the reset options highlighted above).

In accordance with another alternative method for autonomous cell reselection, the E-DCH for CELL_FACH terminates at a Serving RNC (SRNC) for all data. In accordance with this method, the MAC-es terminates in the SRNC for all types of data traffic, including CCCH, and the CELL_UPDATE message is received and decoded in the MAC-es in the SRNC. As disclosed in above methods, the initial steps prior to sending the CELL_UPDATE message by the WTRU are the same.

Once the CELL_UPDATE message is received by the SRNC, the SRNC sends a request to the CRNC to allocate at least the C-RNTI; H-RNTI (if HS-DSCH in CELL_FACH/PCH is supported); E-RNTI (if E-DCH in CELL_FACH is supported); and other information provided by the CRNC in the UL signaling transfer. The request may be signaled by introducing a new RNSAP message, or by using an existing RNSAP procedure, such as Common Transport Channel Request.

The CRNC responds to the SRNC with the requested information, which may be sent using the UL Signaling Transfer Indication or via the Common Transport Channel Response message. The SRNC then transmits the CELL_UPDATE_CONFIRM message to the WTRU. The procedures following the CELL_UPDATE_CONFIRM are similar to the ones described in the methods disclosed above.

For all of the methods disclosed above for autonomous cell reselection, the SRNC has the option to allocate E-DCH resources to the WTRU. The set of E-DCH resources can be signaled and provided in the CELL_UPDATE_CONFIRM message, or signaled as an index to one of the broadcasted set of resources in the SIBs using the CELL_UPDATE_CONFIRM. The WTRU may then use that set of resources to transmit uplink data in CELL_FACH.

The SRNC may chose to give these resources to the WTRU every time a cell reselection is performed, or when the WTRU has additional data to send. In accordance with the latter scenario, the WTRU may include with the CELL_UPDATE message an indication of the amount of other additional data and the logical channel to which they belong. Alternatively, it can signal just an indication that it has other data to transmit. The RNC can then use this information to decide whether the WTRU requires E-DCH uplink resources. If no additional data are to be sent by the WTRU, the RNC sets up the transport channel and physical channel resources in the target Node B. The RNC does not signal to the WTRU any E-DCH resources.

An alternative network assisted cell reselection method is disclosed wherein the network preferably has control of cell reselection. In accordance with this method, the WTRU measures the channel quality and provides these measurements to the network via measurement reports. Triggering criteria is defined for CELL_FACH WTRUs to transmit these measurement reports. The network then controls cell reselection, based on the received measurements.

The network may initiate cell reselection based on measurements taken from Node Bs in the alternative. If the conditions for a cell reselection are met, the network may decide to move the WTRU to CELL_DCH in the target cell, or keep the WTRU in CELL_FACH in the target cell. In this alternative, the WTRU is kept in CELL_FACH. The network transmits an RRC message through a source cell to the WTRU. The WTRU, in response to the receipt of the RRC message, stops transmitting in the source cell and ceases monitoring the DL E-DCH channels in the source cell. E-DCH resources are then re-acquired in the target cell using, for example, a power ramp up procedure. The WTRU then resets the MAC es/e entities and/or HARQ processes by sending a MAC-es/e reset indicator in the RRC message and perform a full MAC-e/es reset procedure (i.e., flush HARQ and reset TSN to 0).

The MAC-e/es entities may also be reset by performing a special reset that only flushes the HARQ buffers without altering the TSN used for reordering. The MAC-e PDUs that are in the HARQ buffers would require retransmission from some higher layer protocol. The special reset can be indicated as a special bit in one of the RRC messages ordering the handover, or it can be specified in the cell reselection procedure for WTRUs using E-DCH in CELL_FACH. For example, the WTRU using E-DCH performs a special reset every time a cell reselection occurs while it is in CELL_FACH or CELL_PCH. In the case where SRNS relocation occurs together with a cell reselection, the WTRU needs to perform a full MAC-e/es reset.

Another method for resetting the MAC entities sends a special reset signal to the WTRU informing the WTRU to restart all active HARQ processes in the target cell. The RNC tells the source Node B that the old connection is ending and informs the target Node B to set up for the upcoming connection.

Alternatively, the network could pre-allocate E-DCH resources in the target cell and provide this allocation information in the RRC message.

The source Node B, alternatively, can signal the WTRU to stop transmission (i.e. through a zero grant). The WTRU then initiates cell reselection upon reception of this signal.

In an alternative method for mixed autonomous/network cell reselection, the WTRU decides to perform a handover to the target cell using the cell reselection criteria. Instead of acquiring the system information of the target cell and sending the CELL_UPDATE message to the target cell, as disclosed above, the WTRU sends the CELL_UPDATE to the source cell with an indication of a desired target cell. The CELL_UPDATE message includes the cell ID of the target cell.

Upon reception of CELL_UPDATE by the source Node B, the message is forwarded to the RNC. The RNC then sets up the E-DCH resources in the target cell, which can be resources that are specified in the CELL_UPDATE_CONFIRM or an index to one of the broadcasted set of E-DCH resources. After sending the CELL_UPDATE message, the WTRU reads the System Information broadcast and connects to the target cell to receive the CELL_UPDATE_CONFIRM message. If the confirm message is not received by the WTRU and the CELL_UPDATE timer expires, the WTRU reattempts to send the CELL_UPDATE over the target cell by initiating a RACH access.

The WTRU may have the option to choose to send the initial CELL_UPDATE over the source Node B or over the target Node B. The WTRU may use one or more of the following conditions for choosing to send the CELL_UPDATE over the source Node B: the WTRU has dedicated E-DCH resources allocated in CELL_FACH in the source Node B; the WTRU has been given RACH access for an UL transmission prior to initiating the cell reselection, and thus the WTRU can still use the given resources for the remaining time; the WTRU always sends CELL_UPDATE over the source cell; or the WTRU has data to send other than the CELL_UPDATE.

Upon reception of the CELL_UPDATE message, the SRNC has the option of giving the WTRU a set of resources or an index to the set of resources broadcasted in the SIBs. The RNC may choose to give these resources to the WTRU every time a cell reselection is performed, or when the WTRU has additional data to send. The WTRU may include in the CELL_UPDATE an indication of the amount of other additional data and the logical channel to which they belong. Alternatively, the WTRU signals an indication that it has other data to transmit.

The RNC can then use this information to decide whether the WTRU requires E-DCH uplink resources. If no additional data are to be sent by the WTRU, the RNC sets up the transport channel, and physical channel resources in the target Node B but does not signal to the WTRU any E-DCH resources.

Alternatively, the network responds with CELL_UPDATE_CONFIRM (or other RRC message) in source cell, providing the resources to use in target cell. The WTRU may respond with a message informing network that the physical channel reconfiguration has been completed. The network should use this message as indication to stop transmitting in source cell and to release all MAC e/es resources in that cell/NodeB.

A timer is preferably started upon sending the cell update message. If unsuccessful or if the network responds with a R7-like CELL_UPDATE_CONFIRM, the WTRU should abort its attempts to communicate with the source cell and attempt to transmit the CELL_UPDATE over the target cell using one or a combination of the procedures described in the first embodiment.

Although the features and elements are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method performed by a wireless transmit/receive unit (WTRU), the method comprising:
   receiving a system information block (SIB) from a base station, wherein the SIB indicates random access transmission uplink resources;
   after receiving the SIB, transmitting a random access preamble to the base station;
   after transmitting the random access preamble, transmitting, using one or more of the uplink resources indicated by the SIB, a first message to the base station, wherein the first message includes a first radio network temporary identifier (RNTI) of the WTRU;
   after transmitting the first message, receiving a second message from the base station, wherein the second message is derived from a second RNTI, the second RNTI being different than the first RNTI; and
   after receiving the second message, transmitting to the base station.

2. The method of claim 1, wherein the first message is transmitted using a HARQ process.

3. The method of claim 1, further comprising calculating a third RNTI for random access transmissions with the base station.

4. The method of claim 3, wherein the third RNTI is the same as the first RNTI or the second RNTI.

5. A wireless transmit/receive unit (WTRU) comprising:
   a transceiver; and
   a processor,
   wherein the transceiver and the processor are configured to cause the WTRU to:
   receive a system information block (SIB) from a base station, wherein the SIB indicates random access transmission uplink resources;
   after receiving the SIB, transmit a random access preamble to the base station;
   after transmitting the random access preamble, transmit, using one or more of the uplink resources indicated by the SIB, a first message to the base station, wherein the first message includes a first radio network temporary identifier (RNTI) of the WTRU;
   after transmitting the first message, receive a second message from the base station, wherein the second message is derived from a second RNTI, the second RNTI being different than the first RNTI; and
   after receiving the second message, transmit to the base station.

6. The WTRU of claim 5, wherein the first message is transmitted using a HARQ process.

7. The WTRU of claim 5, wherein the transceiver and the processor are further configured to calculate a third RNTI for random access transmissions with the base station.

8. The WTRU of claim 5, wherein the third RNTI is the same as the first RNTI or the second RNTI.

9. A method performed by a wireless transmit/receive unit (WTRU), the method comprising:
   receiving control information from a first cell, wherein the control information indicates uplink resources for use with random access transmission;
   after receiving the control information, transmitting a random access preamble to a second cell;
   after transmitting the random access preamble, transmitting, using one or more of the uplink resources indicated by the control information, a first message to the second cell, wherein the first message includes a first radio network temporary identifier (RNTI) of the WTRU;
   after transmitting the first message, receiving a second message from the second cell, wherein the second message is derived from a second RNTI, the second RNTI being different than the first RNTI; and
   after receiving the second message, transmitting to the second cell,
   wherein the first cell and the second cell are associated with a same base station.

10. The method of claim 9, wherein the first message is transmitted using a HARQ process.

11. The method of claim 9, further comprising calculating a third RNTI for random access transmissions with the second cell.

12. The method of claim 9, wherein the third RNTI is the same as the first RNTI or the second RNTI.

13. A wireless transmit/receive unit (WTRU) comprising:
    a transceiver; and
    a processor,
    wherein the transceiver and the processor are configured to cause the WTRU to:
    receive control information from a first cell, wherein the control information indicates uplink resources for use with random access transmission;
    after receiving the control information, transmit a random access preamble to a second cell;

after transmitting the random access preamble, transmit, using one or more of the uplink resources indicated by the control information, a first message to the second cell, wherein the first message includes a first radio network temporary identifier (RNTI) of the WTRU;

after transmitting the first message, receive a second message from the second cell, wherein the second message is derived from a second RNTI, the second RNTI being different than the first RNTI; and after receiving the second message, transmit to the second cell, wherein the first cell and the second cell are associated with a same base station.

14. The WTRU of claim 13, wherein the first message is transmitted using a HARQ process.

15. The WTRU of claim 13, further comprising calculating a third RNTI for random access transmissions with the second cell.

16. The WTRU of claim 13, wherein the third RNTI is the same as the first RNTI or the second RNTI.

* * * * *